United States Patent
Frota et al.

(10) Patent No.: US 12,516,985 B2
(45) Date of Patent: Jan. 6, 2026

(54) COOLING OPTICAL INTERCONNECTS USING LIGHT

(71) Applicant: INTERNATIONAL BUSINESS MACHINES CORPORATION, Armonk, NY (US)

(72) Inventors: Rafaela Frota, Poughkeepsie, NY (US); Faezeh Gholami, Ridgewood, NJ (US); John S. Werner, Fishkill, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 18/504,349

(22) Filed: Nov. 8, 2023

(65) Prior Publication Data

US 2025/0146875 A1   May 8, 2025

(51) Int. Cl.
*H04B 10/00* (2013.01)
*G01J 5/061* (2022.01)
*H04B 10/80* (2013.01)

(52) U.S. Cl.
CPC .............. *G01J 5/061* (2013.01); *H04B 10/801* (2013.01)

(58) Field of Classification Search
CPC ... H04B 10/11; H04B 10/112; H04B 10/1123; H04B 10/114; H04B 10/1143; H04B 10/1149; H04B 10/40; H04B 10/116; H04B 10/2507; H04B 10/0795; H04B 10/801; H04B 10/0799; G01J 5/061
USPC ....... 398/118, 119, 127, 128, 129, 130, 131, 398/135, 136, 137, 138, 139, 33, 38, 25, 398/26, 27, 158, 159, 172, 192, 193, 194, 398/195, 79; 372/32, 34, 36, 38.02
See application file for complete search history.

(56) References Cited

U.S. PATENT DOCUMENTS

| | | | |
|---|---|---|---|
| 7,200,337 B2 * | 4/2007 | Hosking | H04B 10/40 398/136 |
| 9,008,518 B2 * | 4/2015 | Tan | H05K 1/0201 398/159 |
| 10,368,464 B2 | 7/2019 | Chen et al. | |
| 10,947,394 B2 | 3/2021 | Xu et al. | |
| 11,084,943 B2 | 8/2021 | Overmeere et al. | |
| 2015/0139661 A1 * | 5/2015 | Aronson | H04B 10/40 398/135 |
| 2021/0191017 A1 | 6/2021 | Shen et al. | |
| 2022/0357116 A1 | 11/2022 | Yang et al. | |

FOREIGN PATENT DOCUMENTS

CN   109121357 A   7/2020

OTHER PUBLICATIONS

Yang et al., Geopolymer-based sub-ambient daytime radiative cooling coating, EcoMat, vol. 5, Issue 2, DOI: 10.1002/eom2.12284, URL: https://onlinelibrary.wiley.com/doi/epdf/10.1002/eom2.12284, First Published Sep. 14, 2022, dated Feb. 2023, 10 pages.

* cited by examiner

*Primary Examiner* — Hanh Phan
(74) *Attorney, Agent, or Firm* — Onyx IP Group (57) ABSTRACT

Methods, apparatus, and systems for cooling optical interconnects using light include monitoring an output power of a transceiver, where the transceiver includes an alkali activated geopolymer (AAGP) coating, and cooling, based on a determination that the output power has decreased below a threshold value, the transceiver by directing infrared light towards the transceiver.

20 Claims, 6 Drawing Sheets

COOLING OPTICAL INTERCONNECTS USING LIGHT

BACKGROUND

Field of the Disclosure

The field of the disclosure is cooling, or, more specifically, methods and systems for cooling optical interconnects using light.

Description of Related Art

Optical interconnects are components or systems configured for transmitting signals using light. Optical interconnects may get hot during normal use, which can cause a decrease in output power, longer wavelengths, increased errors, and other performance issues. Optical interconnects may be cooled during operation in order to avoid negatively impacting performance.

SUMMARY

Methods and systems for cooling optical interconnects using light according to various embodiments are disclosed in this specification. In accordance with one aspect of the present disclosure, a method of cooling optical interconnects using light may include monitoring the output power of a transceiver, where the transceiver includes an alkali activated geopolymer (AAGP) coating, and cooling, based on a determination that the output power has decreased below a threshold value, the transceiver by directing infrared light towards the AAGP coating on the transceiver.

In accordance with another aspect of the present disclosure, cooling optical interconnects using light may include a system including a transceiver including an alkali activated geopolymer (AAGP) coating, an infrared device, and a computer processor configured to: monitor the output power of the transceiver, and cool, based on a determination that the output power has decreased below a threshold value, the transceiver by the infrared device directing infrared light towards the AAGP coating on the transceiver.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
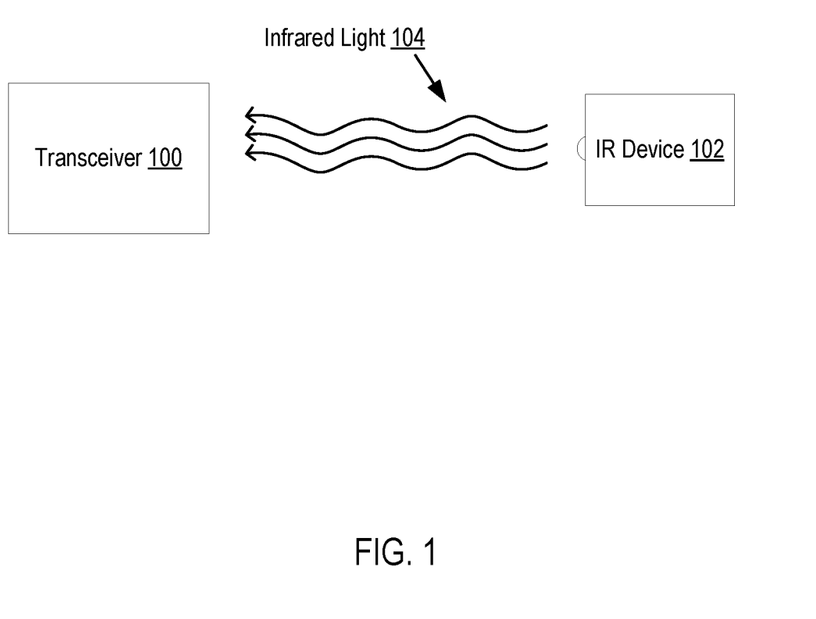
FIG. 1 shows a block diagram of an example system configured for cooling optical interconnects using light in accordance with embodiments of the present disclosure.

Exemplary methods, apparatus, and systems for cooling optical interconnects using light in accordance with the present disclosure are described with reference to the accompanying drawings, beginning with FIG. 1. FIG. 1 sets forth a block diagram of an example system configured for cooling optical interconnects using light in accordance with embodiments of the present disclosure. The example system of FIG. 1 includes a transceiver 100, an IR (infrared) device 102, and infrared light 104.

The example transceiver 100 in FIG. 1 may be any type of transceiver or optical interconnect configured to receive or transmit electromagnetic waves. In one embodiment, transceiver 100 includes a laser. For example, the transceiver may comprise a DFB (distributed feedback) laser. The transceiver may be positioned within a rack, a server or other computing system, and the like.

The example IR device 102 of FIG. 1 may be any infrared device configured to transmit infrared light, such as infrared light 104. In the example of FIG. 1, IR device 102 is configured to transmit infrared light 104 towards transceiver 100. The IR device may be mounted on another computer component, on a computing system, on a rack or rack component, or any other position where the IR device is able to transmit infrared light to the transceiver.

Optical interconnects, such as transceiver 100, can heat up during normal operation. As a transceiver heats up, the higher operating temperatures can negatively affect transceiver performance and can cause higher error rates in the system. In an embodiment where the transceiver includes a laser, the wavelength of the laser lengthens as the transceiver temperature increases, which may affect performance or cause errors. Additionally, when the operating temperature of the transceiver increases, the transceiver may begin to consume additional power in order to keep the laser's output power constant. Specifically, a laser's output power decreases as the temperature of the laser increases.

In the system of FIG. 1, the transceiver 100 may be monitored during normal and stable operation in a known cool environment to establish baseline measurements for the transceiver (such as temperature, power output, power consumption, wavelength, error rates, and the like). In establishing a baseline for the transceiver, measurements obtained during future monitoring of the transceiver may be compared, in real time, to the baseline measurements in order to determine when the transceiver is getting too hot or otherwise starting to perform irregularly. For example, the output power of a transceiver may be monitored to determine if the output power differs from the established baseline by a threshold amount (such as falling below a threshold power output value based on the established baseline), indicating that the transceiver temperature is increasing. In such an embodiment, monitoring the temperature of the transceiver includes monitoring the output power of the transceiver.

In another embodiment, monitoring the temperature of the transceiver includes monitoring the power consumption of the transceiver. For example, in an embodiment where the transceiver modifies its power consumption to maintain a constant output power, the transceiver is configured to increase its power consumption as the output power decreases in order to maintain a constant output power. In such an example, the power consumption of the transceiver may be monitored to determine when the transceiver's temperature is increasing based on a determination that the transceiver's power consumption has increased a threshold amount above the baseline power consumption. In another embodiment, the temperature of the transceiver may be monitored directly, such as by obtaining real time temperature measurements of the transceiver and identifying when the transceiver's temperature increases.

The system of FIG. 1 is configured to cool the transceiver 100, thereby preventing increased error rates and increasing the overall performance of the system. Cooling the transceiver 100 may be carried out via passive radiative cooling and may be performed responsive to determining that the transceiver has increased in temperature beyond a predetermined temperature threshold. The process of cooling the transceiver 100 of FIG. 1 is dependent on an infrared-activated agent included in the transceiver. In one embodiment, such an infrared-activated agent may include a sub-ambient daytime radiative cooling coating (SDRCC) included as part of the transceiver. An SDRCC is a thermal management technology that relies on a surface's specific physical makeup to provide the surface with reflective and emissive properties that allow the surface to be cooled below ambient temperatures when interacting with specific wavelengths of light. Passive radiative cooling is carried out by reflecting solar energy and releasing thermal energy through the atmospheric window (in the infrared band of electromagnetic radiation). An SDRCC is configured with a high solar reflectance and a high infrared emittance, allowing the coating to undergo passive radiative cooling when interacting with infrared light. One example of an SDRCC is an inorganic coating made up of geopolymers.

In one embodiment, the transceiver 100 includes an alkali activated geopolymer (AAGP), which is configured to cool the transceiver in response to an interaction with infrared light. The AAGP may be included as part of the structure of the transceiver, such as the outer layer of the transceiver. In another embodiment, the AAGP may comprise a coating that is applied to an exterior surface of the transceiver, or the AAGP may be a wrap or tape that is wrapped around or applied to the transceiver, and the like.

The IR device 102 is configured to transmit infrared light 104 towards to the transceiver 100 to cool the transceiver. Transmitting the infrared light 104 towards the transceiver may be carried out in response to determining that the transceiver has increased in temperature. When the infrared light hits AAGP surface of the transceiver, the transceiver is cooled via the radiative cooling process based on the AAGP surface of the transceiver. In such an embodiment, the temperature of the transceiver may be controlled and kept below a temperature threshold in order to minimize excessive power consumption and increased error rates or performance issues. In one embodiment, the power consumption of the IR device 102 is less than the added increase in power consumption of a heated transceiver, such that radiatively cooling the transceiver via the infrared device allows for net power consumption savings. Such a cooling process is useful in optical frequency combs, spectroscopy, and many other optics technologies.

Figure 2:
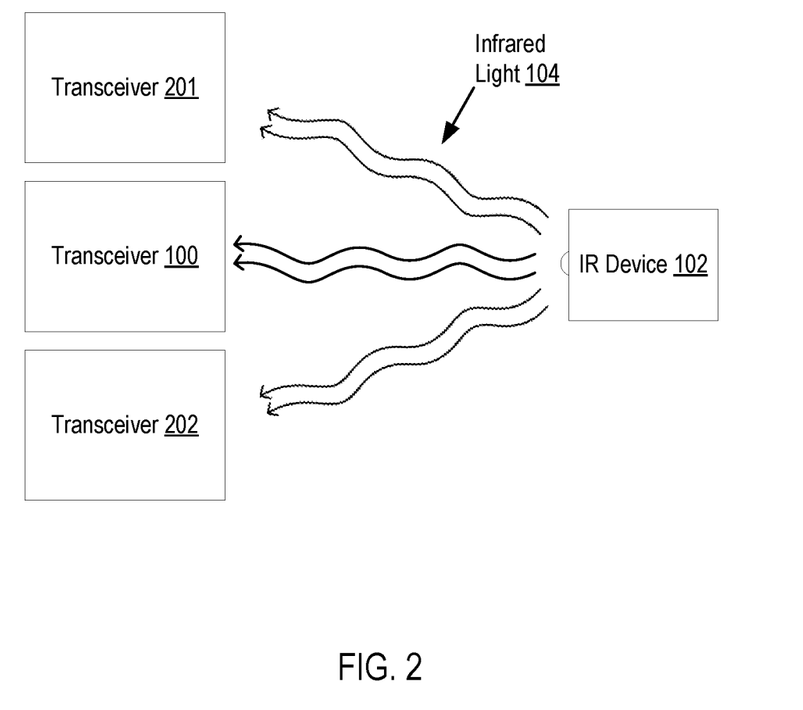
FIG. 2 shows a block diagram of an example system configured for cooling optical interconnects using light in accordance with embodiments of the present disclosure.

For further explanation, FIG. 2 sets forth a block diagram of another example system configured for cooling optical interconnects using light in accordance with embodiments of the present disclosure. The example of FIG. 2 differs from FIG. 1 in that FIG. 2 further includes multiple other transceivers, such as transceiver 201 and transceiver 202. In the example of FIG. 2, the IR device 102 is configured to transmit infrared light 104 towards multiple transceivers. In one embodiment, the IR device is configured to direct the infrared light towards multiple transceivers simultaneously. In another embodiment, the IR device is configured to alter where it directs the infrared light, allowing the IR device to change which transceiver the IR device directs the infrared light towards. In the example of FIG. 2, additional power savings may be obtained by radiatively cooling multiple transceivers with a single IR device.

Figure 3:
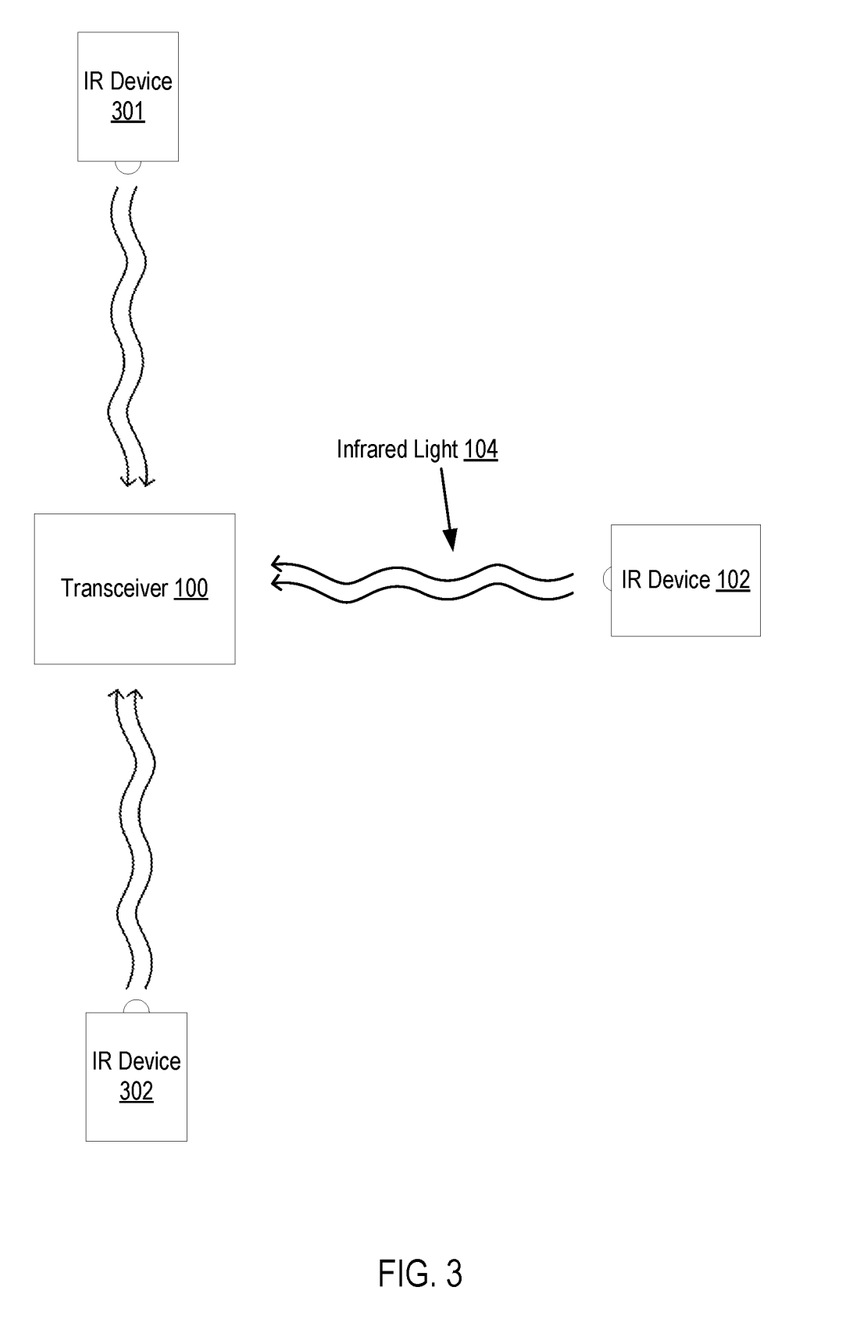
FIG. 3 shows a block diagram of an example system configured for cooling optical interconnects using light in accordance with embodiments of the present disclosure.

For further explanation, FIG. 3 sets forth a block diagram of another example system configured for cooling optical interconnects using light in accordance with embodiments of the present disclosure. The example of FIG. 3 differs from FIG. 1 in that FIG. 3 further includes multiple other IR devices, such as IR device 301 and IR device 302. In the example of FIG. 3, multiple IR devices are configured to transmit infrared light 104 towards a single transceiver. In the example embodiment of FIG. 3, the IR devices are positioned to direct the infrared light towards multiple different surfaces of the transceiver 100. That is, in the example of FIG. 3, transceiver 100 may have infrared light directed towards it from multiple angles, so as to increase the effect of radiative cooling by cooling down multiple surfaces of the transceiver simultaneously. In such an example, the transceiver may be cooled more quickly when compared to an embodiment having only a single IR device transmitting infrared light towards the transceiver.

Figure 4:
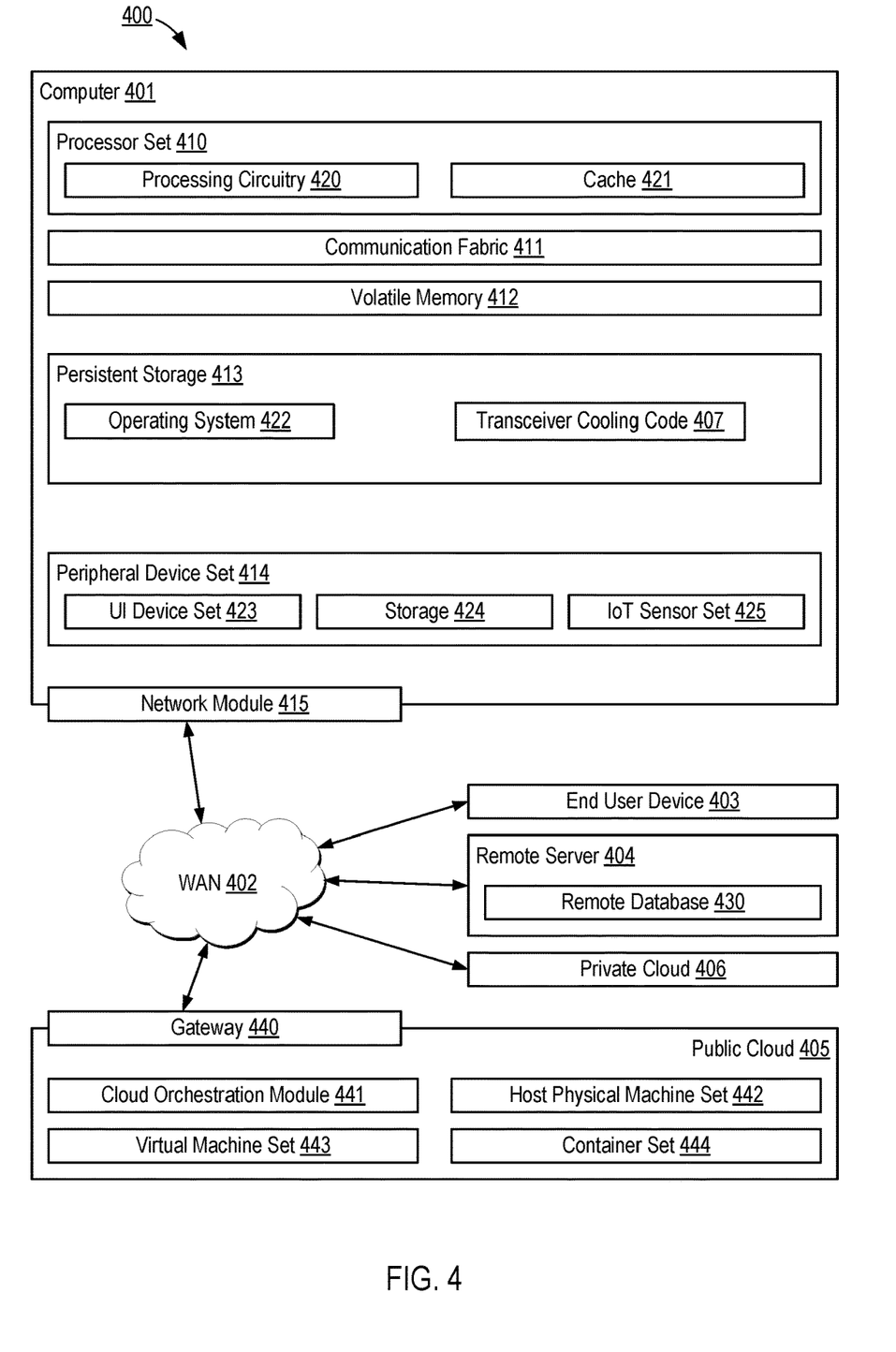
FIG. 4 is a block diagram of an example computing environment configured for cooling optical interconnects using light according to some embodiments of the present disclosure.

For further explanation, FIG. 4 sets forth a block diagram of computing environment 400 configured for cooling optical interconnects using light in accordance with embodiments of the present disclosure. Computing environment 400 contains an example of an environment for the execution of at least some of the computer code involved in performing the inventive methods, such as transceiver cooling code 407. In addition to transceiver cooling code 407, computing environment 400 includes, for example, computer 401, wide area network (WAN) 402, end user device (EUD) 403, remote server 404, public cloud 405, and private cloud 406. In this example embodiment, computer 401 may be coupled to one or more of the transceiver 100 and IR device 102 of FIG. 1, and includes processor set 410 (including processing circuitry 420 and cache 421), communication fabric 411, volatile memory 412, persistent storage 413 (including operating system 422 and transceiver cooling code 407, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

Computer 401 may take the form of a desktop computer, laptop computer, tablet computer, smart phone, wearable computer, smart watch, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

Processor set 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in transceiver cooling code 407 in persistent storage 413.

Communication fabric 411 is the signal conduction path that allows the various components of computer 401 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

Persistent storage 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in transceiver cooling code 407 typically includes at least some of the computer code involved in performing the inventive methods.

Peripheral device set 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

Network module 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

Remote server 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

Public cloud 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Figure 5:
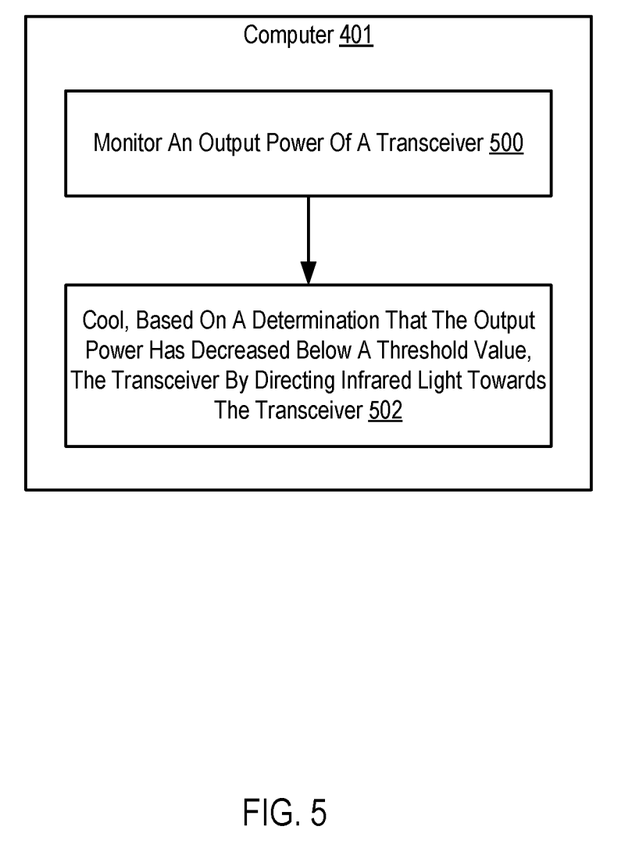
FIG. 5 is a flowchart of an example method for cooling optical interconnects using light according to some embodiments of the present disclosure.

For further explanation, FIG. 5 sets forth a flow chart illustrating an exemplary method of cooling optical interconnects using light according to embodiments of the present disclosure. The method of FIG. 5 includes monitoring 500 an output power of a transceiver. Monitoring 500 an output power of a transceiver may be carried out by a processor, such as a processor of computer 401, receiving real time output power measurements from transceiver 100. Output power measurements may include data indicating the amount of power being output by a laser or any other type of emitter included within the transceiver.

The method of FIG. 5 also includes cooling 502, based on a determination that the output power has decreased below a threshold value, the transceiver by directing infrared light towards the transceiver. Cooling 502 the transceiver may be carried out by the processor, such as the processor of computer 401, sending instructions to the IR device (such as IR device 102 of FIG. 1) to transmit infrared light towards the transceiver 100. In one embodiment, the processor may send such an instruction to an IR device controller, which may control one or more IR devices, where the IR device controller identifies which IR device (or IR devices) are configured to transmit infrared light to the transceiver specified in the instruction and sends an instruction to the one or more identified IR devices to transmit infrared light to the transceiver. In the example embodiment of FIG. 5, cooling 502 the transceiver is carried out based on a determination that the output power of the transceiver has increased above a threshold value. In such an embodiment, the threshold value may be a predetermined value that is known to indicate that a temperature of the transceiver has increased (to above a temperature threshold). In one embodiment, the IR device is configured to direct infrared light towards the transceiver for a predetermined amount of time. In another embodiment, the IR device is configured to direct infrared light towards the transceiver until the temperature of the transceiver falls below a threshold temperature, such as a temperature based on the baseline measurements of the transceiver. In another embodiment, the IR device is configured to direct infrared light towards the transceiver until the output power decreases below the threshold value.

Figure 6:
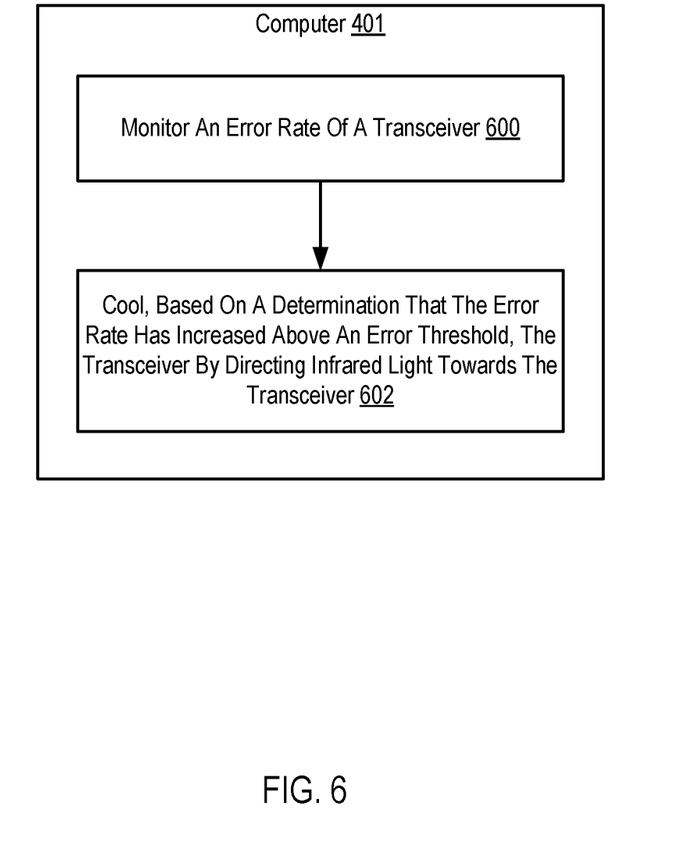
FIG. 6 is a flowchart of another example method for cooling optical interconnects using light according to some embodiments of the present disclosure.

For further explanation, FIG. 6 sets forth a flow chart illustrating another exemplary method of cooling optical interconnects using light according to embodiments of the present disclosure. The method of FIG. 6 includes monitoring 600 an error rate of a transceiver. Monitoring 600 an error rate of a transceiver may be carried out by a processor, such as a processor of computer 401, calculating a real time error rate based on received errors from the transceiver or other components of the system (such as components coupled to the transceiver).

The method of FIG. 6 also includes cooling 602, based on a determination that the error rate has increased above an error threshold, the transceiver by directing infrared light towards the transceiver. Cooling 602 the transceiver may be carried out by the processor, such as the processor of computer 401, sending instructions to the IR device (such as IR device 102 of FIG. 1) to transmit infrared light towards the transceiver 100. In one embodiment, the processor may send such an instruction to an IR device controller, which may control one or more IR devices, where the IR device controller identifies which IR device (or IR devices) are configured to transmit infrared light to the transceiver specified in the instruction and sends an instruction to the one or more identified IR devices to transmit infrared light to the transceiver. In the example embodiment of FIG. 6, cooling 602 the transceiver is carried out based on a determination that the error rate of the transceiver has increased above an error threshold. In such an embodiment, the error threshold may be a predetermined error rate that is known to correlate with increased transceiver temperatures. In one embodiment, the IR device is configured to direct infrared light towards the transceiver until the error rate decreases below the error threshold.

In view of the explanations set forth above, readers will recognize that the benefits of cooling optical interconnects using light according to embodiments of the present disclosure include:

Increasing system efficiency by decreasing overall power consumption of a transceiver.

Decreasing error rates caused by increased transceiver temperatures, such as by radiatively cooling transceivers using infrared light from IR devices.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for cooling optical interconnects using light, comprising:
    monitoring an output power of a transceiver, wherein the transceiver includes an alkali activated geopolymer (AAGP) coating; and
    cooling, based on a determination that the output power has decreased below a threshold value, the transceiver by directing infrared light towards the transceiver.

2. The method of claim 1, wherein the infrared light is directed towards the transceiver from an infrared device.

3. The method of claim 2, wherein the infrared device is configured to direct the infrared light towards multiple transceivers.

4. The method of claim 1, wherein the infrared light is directed towards the transceiver from multiple angles via multiple infrared devices.

5. The method of claim 1, wherein the transceiver is cooled based on the infrared light and the AAGP coating.

6. The method of claim 1, wherein cooling the transceiver includes lowering the output power of the transceiver.

7. The method of claim 1, wherein the infrared light is directed towards the transceiver for a predetermined amount of time.

8. The method of claim 1, wherein the infrared light is directed towards the transceiver until the output power increases above the threshold value.

9. The method of claim 1, wherein the infrared light is directed towards the transceiver until a temperature of the transceiver falls below a threshold temperature.

10. The method of claim 1, wherein cooling the transceiver by directing the infrared light towards the transceiver is carried out based on a monitored error rate for the transceiver.

11. A system for cooling optical interconnects using light, the system comprising:
    a transceiver including an alkali activated geopolymer (AAGP) coating;
    an infrared device; and
    a computer processor configured to:
        monitor an output power of the transceiver; and
        cool, based on a determination that the output power has decreased below a threshold value, the transceiver by the infrared device directing infrared light towards the transceiver.

12. The system of claim 11, further comprising multiple transceivers.

13. The system of claim 12, wherein the infrared device is configured to direct the infrared light towards the multiple transceivers.

14. The system of claim 11, further comprising multiple infrared devices, wherein the infrared light is directed towards the transceiver from multiple angles via the multiple infrared devices.

15. The system of claim 11, wherein the transceiver is cooled based on the infrared light and the AAGP coating.

16. The system of claim 11, wherein cooling the transceiver includes lowering the output power of the transceiver.

17. The system of claim 11, wherein the infrared light is directed towards the transceiver for a predetermined amount of time.

18. The system of claim 11, wherein the infrared light is directed towards the transceiver until the output power decreases below the threshold value.

19. The system of claim 11, wherein the infrared light is directed towards the transceiver until a temperature of the transceiver falls below a threshold temperature.

20. The system of claim 11, wherein cooling the transceiver by directing the infrared light towards the transceiver is carried out based on a monitored error rate for the transceiver.

* * * * *